(12) United States Patent
Boriah et al.

(10) Patent No.: US 9,430,839 B2
(45) Date of Patent: Aug. 30, 2016

(54) UNSUPERVISED FRAMEWORK TO MONITOR LAKE DYNAMICS

(71) Applicants: Shyam Boriah, Cambridge, MA (US); Vipin Kumar, Minneapolis, MN (US); Ankush Khandelwal, Minneapolis, MN (US); Xi C. Chen, Minneapolis, MN (US)

(72) Inventors: Shyam Boriah, Cambridge, MA (US); Vipin Kumar, Minneapolis, MN (US); Ankush Khandelwal, Minneapolis, MN (US); Xi C. Chen, Minneapolis, MN (US)

(73) Assignee: Regents of the University of Minnesota, Minneapolis, MN (US)

( * ) Notice: Subject to any disclaimer, the term of this patent is extended or adjusted under 35 U.S.C. 154(b) by 0 days.

(21) Appl. No.: 14/673,010

(22) Filed: Mar. 30, 2015

(65) Prior Publication Data
US 2015/0278627 A1 Oct. 1, 2015

Related U.S. Application Data

(60) Provisional application No. 61/972,794, filed on Mar. 31, 2014.

(51) Int. Cl.
| | | |
|---|---|---|
| *G06K 9/34* | (2006.01) | |
| *G06T 7/00* | (2006.01) | |
| *G06K 9/00* | (2006.01) | |
| *G06K 9/20* | (2006.01) | |
| *G06K 9/46* | (2006.01) | |
| *G06K 9/62* | (2006.01) | |

(52) U.S. Cl.
CPC .......... *G06T 7/0081* (2013.01); *G06K 9/0063* (2013.01); *G06K 9/209* (2013.01); *G06K 9/4638* (2013.01); *G06K 9/6218* (2013.01); *G06K 9/6256* (2013.01); *G06T 2207/20021* (2013.01); *G06T 2207/30181* (2013.01)

(58) Field of Classification Search
None
See application file for complete search history.

(56) References Cited

U.S. PATENT DOCUMENTS 6,704,439 B1 * 3/2004 Lee ...................... G06T 7/0081
382/131
2015/0317798 A1 * 11/2015 Li ........................ G06T 7/0081
382/131

OTHER PUBLICATIONS

Bowman et al., Fire in the Earth System, Science, Livestock Decoded, vol. 324, pp. 481-484, 2009.
Brakenridge, et al., Global Mapping of Storm Surges and the Assessment of Coastal Vulnerability, Natural Hazards, vol. 66, No. 3, pp. 12-95-1312, 2013.
Carroll et al., Shrinking Lakes of the Arctic: Spatial Relationships and Trajectory of Change, Geophysical Research Letters, vol. 38, No. 20, 2011.

(Continued)

*Primary Examiner* — Feng Niu
(74) *Attorney, Agent, or Firm* — Theodore M. Magee; Westman, Champlin & Koehler, P.A

(57) ABSTRACT

A method of reducing processing time when assigning geographic areas to land cover labels using satellite sensor values includes a processor receiving a feature value for each pixel in a time series of frames of satellite sensor values, each frame containing multiple pixels and each frame covering a same geographic location. For each sub-area of the geographic location, the sub-area is assigned to one of at least three land cover labels. The processor determines a fraction function for a first sub-area assigned to a first land cover label. The sub-areas that were assigned to the first land cover label are reassigned to one of the second land cover label and the third land cover label based on the fraction functions of the sub-areas.

20 Claims, 9 Drawing Sheets

(56) References Cited

OTHER PUBLICATIONS

Chen et al., A New Data Mining Framework for Forest Fire Mapping, In Intelligent Data Understanding (CIDU), 2012 Conference, pp. 104-111, IEEE, 2012.
Collins et al., An Assessment of Several Linear Change Detection Techniques for Mapping Forest Mortality Using Multitemporal Landsat TM Data, Remote Sensing of Environment, vol. 56, No. 1, pp. 66-77, 1996.
Coppin et al., Digital Change Detection in Forest Ecosystems with Remote Sensing Imagery, Remote Sensing Reviews, vol. 13, Nos. 3-4, pp. 207-234, 1996.
Coppin et al., Digital Change Detection Methods in Ecosystem Monitoring: A Review, International Journal of Remote Sensing, vol. 25, No. 9, pp. 1565-1596, 2004.
Cretaux et al., SOLS: A Lake Database to Monitor in the Near Real Time Water Level and Storage Variations from Remote Sensing Data, Advances in Space Research, vol. 47, No. 9, pp. 1497-1507, 2011.
Crist et al., A Physically-Based Transformation of Thematic Mapper Data—The TM Tasseled Cap, IEEE Transactions on Geoscience and Remote Sensing, vol. GE-22, No. 3, 1984.
Deus et al., Remote Sensing Analysis of Lake Dynamics in Semi-Arid Regions: Implication for Water Resource Management. Lake Manyara, East Africa Rift, Northern Tanzania, Open Access, Water, vol. 5, pp. 698-727, 2013.
Dymond et al., Phenological Differences in Tasseled Cap Indices Improved Deciduous Forest Classification, Remote Sensing of Environment, vol. 80, No. 3, pp. 460-472, 2002.
Foody et al., Sub-Pixel Land Cover Composition Estimation Using a Linear Mixture Model and Fuzzy Membership Functions, International Journal of Remote Sensing, vol. 15, No. 3, pp. 619-631, 1994.
Gao et al., Global Monitoring of Large Reservoir Storage from Satellite Remote Sensing, Water Resources Research, vol. 48, W09504, 12 pages, 2012.
Giglio et al., An Active-Fire Based Burned Area Mapping Algorithm for the MODIS Sensor, Remote Sensing of Environment, vol. 113, No. 2, pp. 408-420, 2009.
Gislason et al., Random Forests for Land Cover Classification, Pattern Recognition Letters, vol. 27, pp. 294-300, 2006.
Huang et al., An Assessment of Support Vector Machines for Land Cover Classification, International Journal of Remote Sensing, vol. 23, No. 4, pp. 725-749, 2002.
Justice et al., MODIS-Derived Global Fire Products, in B. Ramachandran, C.O. Justics, and M.J. Abrams, Editors, Land Remote Sensing and Global Environment Change, Springer, pp. 661-679, 2011.
Kaptue et al., Characterization of the Spatial and Temporal Variability of Surface Water in the Soudan-Sahel Region of Africa, Journal of Geophysical Research: Biogeosciences, vol. 118, No. 4, pp. 1472-1483, 2013.
Karpatne et al., Predictive Learning in the Presence of Heterogeneity and Limited Training Data, In Statistical Analysis and Data Mining. SIAM, pp. 253-261, 2014.
Kendall, A New Measure of Rank Correlation, Biometrika, vol. 30, Nos. 1-2, pp. 81-93, 1938.
Keshava et al., Spectral Unmixing. Signal Processing Magazine, IEEE, vol. 19, No. 1, pp. 44-57, 2002.
Koller et al., The Bayesian Network Representation, Probabilistic graphical models: Principles and Techniques, MIT press, Chapter 3, pp. 43-92, 2009.
Liu et al., A Spatial-Temporal Modeling Approach to Reconstructing Land-Cover Change Trajectories from Multi-Temporal Satellite Imagery, Annals, of the Association of American Geographers, vol. 102, No. 6, pp. 1329-1347, 2012.
Lobser et al., MODIS Tasselled Cap: Land Cover Characteristics Expressed Through Transformed MODIS Data, International Journal of Remote Sensing, vol. 28, Nos. 21-22, pp. 5079-5101, 2007.
Lu et al., A Survey of Image Classification Methods and Techniques for Improving Classification Performance, International Journal of Remote Sensing, vol. 28, Nos. 5-6, pp. 823-870, 2007.
Lu et al., Change Detection Techniques, International Journal of Remote Sensing, vol. 20, pp. 2365-2407, 2004.
Massey, Jr., The Kolmogorov-Smirnov Test for Goodness of Fit, Journal of the American Statistical Association, vol. 46, No. 253, pp. 68-78, 1951.
Mithal et al., Monitoring Global Forest Cover Using Data Mining, ACM Transactions on Intelligent Systems and Technology (TIST), vol. 2, No. 4, 36, 2011.
Neill et al., Rapid Detection of Significant Spatial Clusters, In Proceedings of the Tenth ACM SIGKDD International conference on Knowledge Discovery and Data Mining, pp. 256-265, 2004.
Pan et al., A Survey on Transfer Learning, IEEE Transactions on Knowledge and Data Engineering, vol. 22, No. 10, pp. 1345-1359, 2010.
Pang-Ning et al., Introduction to Data Mining, WP Co., pp. 1-165, 2006.
Potere et al., Mapping Urban Areas on a Global Scale: Which of the Eight Maps now Available is More Accurate?, International Journal of Remote Sensing, vol. 20, Nos. 23-24, pp. 6531-6558, 2009.
Ricko et al., Intercomparison and Validation of Continental Water Level Products Derived from Satellite Radar Altimetry, Journal of Applied Remote Sensing, vol. 6, pp. 1-23, 2012.
Sawaya et al., Extending Satellite Remote Sensing to Local Scales: Land and Water Resource Monitoring Using High-Resolution Imagery, Remote Sensing of Environment, vol. 88, pp. 144-156, 2003.
Settle et al., Linear Mixing and the Estimation of Ground Cover Proportions, International Journal of Remote Sensing, vol. 14, No. 6, pp. 1159-1177, 1993.
Settles, Active Learning Literature Survey, University of Wisconsin, Madison, 52:55-66, 2010.
Tango et al., A Flexibly Shaped Spatial Scan Statistic for Detecting Clusters, International Journal of Health Geographies, vol. 4, No. 1, pp. 1-15, 2005.
US Geological Survey and NASA, Land Processes Distributed Active Archive Center (LP DAAC). http://lpdaac.usgs.gov.
U.S. Department of Agriculture, Global Reservoir and Lake (GRLM), http://www.pecad.fas.usda.gov/cropexplorer/global_reservoir/, 2015.
Vorosmarty, et al., Global Water Resources: Vulnerability from Climate Change and Population Growth, Science, vol. 289, No. 5477, pp. 284-288, 2000.

* cited by examiner (a) k = 5.

(b) k = 6.

(c) k = 6.

(d) k = 6.

UNSUPERVISED FRAMEWORK TO MONITOR LAKE DYNAMICS

CROSS-REFERENCE OF RELATED APPLICATION

The present application is based on and claims the benefit of U.S. provisional patent application Ser. No. 61/972,794, filed Mar. 31, 2014, the content of which is hereby incorporated by reference in its entirety.

This invention was made with government support under IIS-1029711 awarded by the National Science Foundation (NSF), and NNX12AP37G awarded by the National Aeronautics and Space Administration (NASA). The government has certain rights in the invention.

BACKGROUND

Approximately two-thirds of the Earth's surface is covered by water in the form of streams, rivers, lakes, wetlands and oceans. Surface water is not only critical to the ecosystems as a key component of the global hydrologic cycle but also is extensively used in daily life (e.g., electricity generation, drinking water, agriculture, transportation, and industrial purposes).

Traditional monitoring/event reporting systems for surface water primarily rely on human observations or in situ sensors. Due to the massive area that water covers, a comprehensive effort that maps changes in global surface water is lacking. This limits our understanding of the hydrologic cycle, hinders water resource management and also compounds risks. For example, unusually heavy rains for four consecutive days as well as melting snow rapidly increased the water levels of lakes and rivers in the Himalayas region of the Indian state of Uttarakhand during June 2013, leading to floods and landslides. Due to the lack of an effective monitoring system of the surface water in this area, no early warning was provided. This unexpected disaster eventually resulted in huge loss of life and property.

SUMMARY

A method of reducing processing time when assigning geographic areas to land cover labels using satellite sensor values includes a processor receiving a feature value for each pixel in a time series of frames of satellite sensor values, each frame containing multiple pixels and each frame covering a same geographic location. For each sub-area of the geographic location, the sub-area is assigned to one of at least three land cover labels. The processor determines a fraction function for a first sub-area assigned to a first land cover label. The sub-areas that were assigned to the first land cover label are reassigned to one of the second land cover label and the third land cover label based on the fraction functions of the sub-areas.

In a further embodiment, a system for more efficiently categorizing pixels in images of a surface is provided. The system includes a memory containing features for each pixel in the images, such that for each sub-area of a geographic location captured by the images there is a time series of features. A processor performing steps that include determining a distribution for the time series of features for each sub-area, forming a graph linking neighboring sub-areas and for each pair of linked sub-areas, breaking the link between the two sub-areas based on differences in the distributions for the time series of features for the two sub areas. The processor also categorizes sub-areas with fewer than a threshold number of links to other sub-areas as a transition category and categorizes sub-areas with at least the threshold number of links as one of at least two other categories.

In a further embodiment, a method for improving identification of land cover from satellite sensor values is provided where a processor performs steps that include receiving satellite sensor values for a collection of sub-areas and forming a graph linking neighboring sub-areas in the collection of sub-areas. For each pair of linked sub-areas, the link between the two sub-areas is broken based on differences between the satellite sensor values of the two sub areas. Sub-areas with fewer than a threshold number of links to other sub-areas are categorized as having a transition land cover while sub-areas with at least the threshold number of links are categorized as having one of at least two other land covers.

DETAILED DESCRIPTION

Figure 1A:
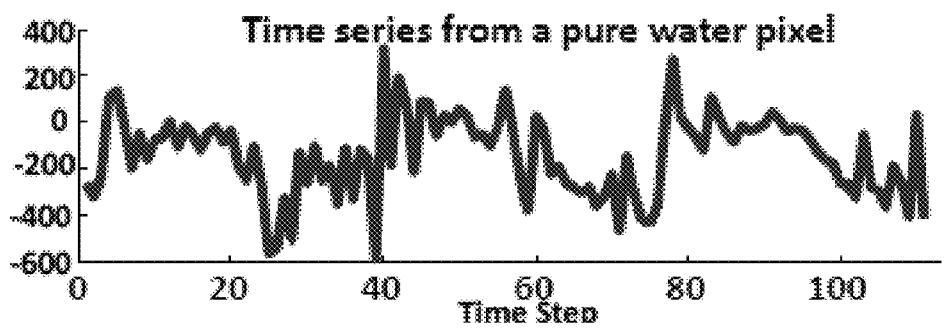
FIG. 1A provides a graph of feature values for a pure water sub-area over a period of time.

Embodiments below provide a methodology for dynamically mapping large freshwater bodies (>4 km$^2$ in surface extent), henceforth called lakes, using remote sensing data as input.

Mapping and monitoring water resources accurately at a global scale using overhead image data is a challenging task.

1) In image data, pixels containing the shoreline are usually a mixture of water and other surface classes (such as vegetation or soil). These other classes may themselves undergo changes, which may or may not be connected to changes in water extent. For example, it is common for vegetation to be present at shorelines; the vegetation can undergo seasonal change independent of water extent, or it may become inundated by increasing water extent, and distinguishing between the two is important. Small islands also pose a challenge, since they may disappear entirely. The issue of mixed pixels is particularly consequential for moderate to coarse-resolution satellite instruments, though it remains an issue even for high-resolution sensors.

2) Unlike vegetation, where phenological cycles are fairly regular and pronounced (especially in the boreal regions), hydrologic cycles are often irregular and do not follow a regular annual cycle. This poses a challenge when estimating long-term variability, and makes the distinction between seasonal change and trend change less evident.

3) Not all bands in the multi-spectral image data set are useful for discriminating water from other classes, and noise and outliers exacerbate this issue. Thus, there is a need for some type of feature selection from the multi-spectral optical remote sensing data, including non-linear combinations on the input bands. As the number of features increases, analysis becomes unsuitable for a human expert and it becomes necessary to utilize supervised classification approaches which can discover optimal class-separating boundaries utilizing the full feature space.

4) There is considerable data heterogeneity on the global scale. Depending on the satellite-sun angle (relative to the water surface), depth, biological activity, turbidity, surface wind and other conditions, similar patches of water can appear to be very different in the remote sensing data; i.e., water surface observations are multi-modal in spectral space. This can be a considerable challenge for classification-based methods since these approaches require training data. Obtaining training data requires substantial manual effort and is often expensive. Furthermore, certain land cover types (e.g. basaltic lava fields) and clouds are similar to some water modes in the spectral space, making the heterogeneity issue more challenging.

5) The lack of representative training data with global coverage also poses a challenge for performance evaluation. In particular, labelled reference data is essential to quantitatively assess and compare the performance of algorithms.

In the various embodiments a novel unsupervised technique for monitoring the surface area of lakes is provided that overcomes many of the challenges discussed above. The various embodiments use a combination of independent validation data and physics-guided labelling to quantitatively evaluate performance.

Problem Setting

The various embodiments use several problem settings in the order of increasing complexity (i.e., fewer assumptions are made). Even though the discussion below only focuses on a univariate scenario, the problem settings are easy to extend to multivariate analysis as well.

Simply put, if a class label (i.e., water or land) can be provided for any pixel at any time, the various embodiments are able to generate a dynamic map that shows the evolution of water extent. Therefore, the general problem is to monitor the evolution of membership for a dataset that contains both spatial and temporal autocorrelations. In detail, the following is one problem solved in some embodiments.

Overall Problem Setting.

Given a univariate spatial temporal dataset D, where $D(i, t)$ is the observation of its $i^{th}$ location at time step t, predict its class label matrix C such that $C(i, t)$ (the element in the $i^{th}$ row and $t^{th}$ column of C) is the class label for the $i^{th}$ location at time step t.

For the sake of simplicity, for any matrix A we use $A(i, :)$ as its $i^{th}$ row, which indicates the corresponding time series at location i. Similarly, we use $A(:, t)$ as its $t^{th}$ column, which indicates observations of all the pixels at time t.

To monitor the dynamics of lake extent, a variable is needed that can distinguish water pixels and land pixels. Without loss of generality, it is assumed that the expected values of land signals are lower than the expected values of water signals at a given region and a given time (If the real variable has higher values for land pixels, we can multiply all the data by −1.). This provides a first overall assumption.

Roughly speaking, locations on the earth are covered either by water or land. Due to limited spatial resolution of remote sensing sensors (e.g., each pixel in our dataset records signals representing more than 15 acres of area), often times a pixel records a signal which is a mixture of the two. Most existing monitoring algorithms do not consider the existence of such mixed pixels and hence cannot provide an accurate classification result. Below, a linear mixing model is used to model mixed pixels.

Definition (Linear Mixing).

Each pixel is a linear mixture of two basis signals w and l representing water and land respectively. Given its fraction number f (i.e., its percentage area covered by water), the expected observation of the give pixel x can be obtained as below.

$$x = f \times w + (1-f) \times l$$

Although mixed pixels are considered in various embodiments and the fractions are calculated, the embodiments provide a class label to each pixel at any time. To do so, mixed pixels whose fraction number is larger than 0.5 are considered water pixels and the mixed pixels whose fraction number is smaller than 0.5 are considered land pixels.

Overall Assumptions.

In some embodiments, two assumptions are used. They are:
1. Water pixels have higher expected values than land pixels.
2. Pixels in the dataset follow a linear mixing model.

Potential Assumptions

Four assumptions are made sequentially by relaxing conditions, i.e., most strict but unrealistic assumption will be provided first and the loosest but closest to reality assumption will be given at the end.

As the most simple but unrealistic assumption, we assume that all pure water pixels (i.e., pixels that covered by water totally) have exactly the same value at all time steps. Similarly, pure land pixels (pixels that contain no water) have exactly the same values over time as well.

Assumption 1.

Let w be the value for pure water pixels and l be the value for pure land pixels. Then, we assume that $$D(i, t) = \begin{cases} w & \text{if } D(i, t) \text{ is a pure water} \\ l & \text{if } D(i, t) \text{ is a pure land} \\ f \times w + (1-f) \times l & \text{otherwise} \end{cases}$$

where f is the fraction number for $D(i, t)$.

Figure 1B:
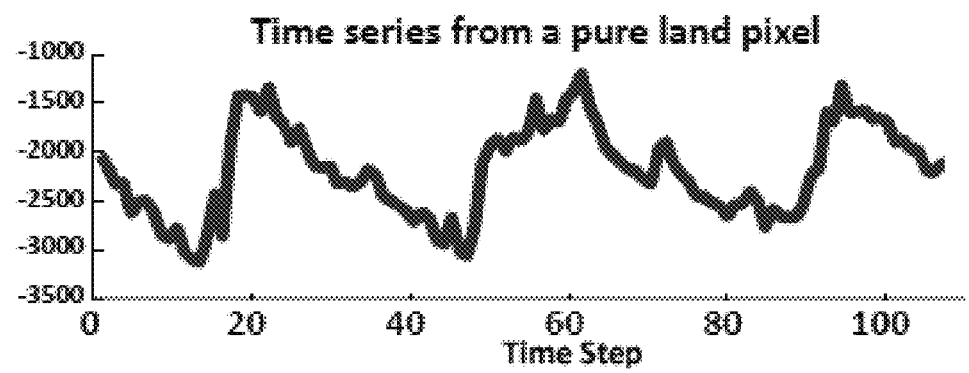
FIG. 1B provides a graph of feature values for a pure land sub-area over a period of time.

Many time series datasets (including the one used in monitoring water surface extent) are non-stationary. Hence, assuming that water pixels (or land pixels) have the same observation over time is unrealistic. For example, FIG. 1A shows a time series of pixel values of a location that is verified as pure water and FIG. 1B shows a time series of pixel values for a location that is verified as pure water by experts, respectively. Both of them show a clear pattern, which verifies that we should not assume values for pure water and pure land pixels are constants over time. By relaxing such constant constraint, we get a second assumption.

Assumption 2.

Let $w(t)$ be the value for pure water pixels and $l(t)$ be the value for pure land pixels at time t. Then, we assume that $$D(i, t) = \begin{cases} w(t) & \text{if } D(i, t) \text{ is a pure water} \\ l(t) & \text{if } D(i, t) \text{ is a pure land} \\ f \times w(t) + (1-f) \times l(t) & \text{otherwise} \end{cases}$$

where f is the fraction number for $D(i, t)$.

Figure 2:
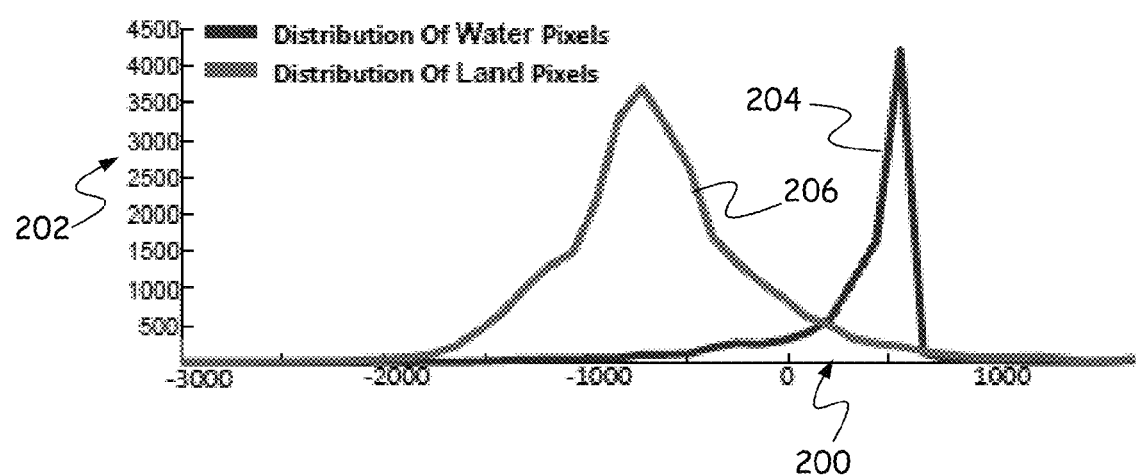
FIG. 2 provides distributions of feature values for water and land sub-areas.

In Assumption 1 and Assumption 2, we assume that values of pure water pixels and pure land pixels are constant variables. However, due to pollutions from noise (which is unavoidable during data collection), they are random variables. Hence, a natural relaxation of Assumption 2 is to consider each observation as a random variable. Besides, our exploration on the dataset shows that pure land pixels and pure water pixels have different variances. FIG. 2 shows a distribution 204 of water pixels and a distribution 206 of land pixels in the area near Coari (Amazon in Brazil) at May 9, 2002, with pixel values shown on horizontal axis 200 and the number of pixels shown on vertical axis 202. We observe that there is a significant difference in the variance of water pixels and land pixels. Hence, we consider that noise in water pixels and land pixels do not share a same variance.

Assumption 3.

Let w(t) be the value for pure water pixels and l(t) be the value for pure land pixels at time t. Then, we assume that any data D(i, t) is the linear combination of its expected value and a white noise. That is, $$D(i, t) = \begin{cases} w(t) + n_w & \text{if } D(i, t) \text{ is a pure water} \\ l(t) + n_l & \text{if } D(i, t) \text{ is a pure land} \\ f \times w(t) + (1-f) \times l(t) + n_m & \text{otherwise} \end{cases}$$

where $n_w$, $n_l$ and $n_m$ are white noise with different variances.

All the previous assumptions state that pure water pixels and pure land pixels form homogeneous sets. In other words, all pure water pixels at the same time step share the same expected value and all pure land pixels at the same time step also share the same expected value. However, within each category (water or land), different locations may have different expected values due to differences in each location's geographical characteristics (e.g., water depth) and setting in a coastal area. This phenomenon is called spatial heterogeneity which is believed to be closest to the reality, relaxes the homogeneity assumption used before and considers the heterogeneity in the dataset.

Assumption 4.

Assume that there are J types of water pixels, which the expected values at time t are $w_t^{(1)}, w_t^{(2)}, \ldots w_t^J$. Similarly, there are K types of land pixels whose expected values are $l_t^1, l_t^{(2)}, \ldots, l_t^{(K)}$. The dataset contains non-trivial number of pure pixels under each type. Then, if D(i, t) is a pure type j water pixel, $$D(i,t) = w_t^{(j)} + n_w$$

Similarly, if it is a pure type k land pixels, then $$D(i,t) = l_t^{(k)} + n_l$$

If D(i, t) is a mixed pixel that is a mixture of type j water and type k land, then $$D(i,t) = f w_t^{(j)} + (1-f) l_t^{(k)} + n_m$$

where $n_w$, $n_l$ and $n_m$ are white noise with different variance.

Problem Formulation

Under different assumptions, the target problem is formulated in different ways. All the problem formulations introduced below aim to calculate a fraction matrix F for the dataset, which the element F(i, t) is the percentage area covered by water in location i at time t. The class label matrix C can be obtained by binarizing the fraction matrix. We use a threshold of 0.5 for binarization.

According to Assumption 1, all pure water pixels in the dataset have value w and all pure land pixels in the dataset have value 1. Based on the two overall assumptions, w≤D(i, t)≤1. Hence, the problem formulated based on Assumption 1 is as below.

Problem Setting 1.

Given dataset D, estimate w, l and a fraction matrix F under the following constraints:

3. l=min(D)
4. w=max(D)
5. D=wF+l(1−F)

where, min(D) and max(D) are the minimum and maximum value in D. 1 is a n×m matrix of which all elements are 1.

Similarly, the problem setting based on Assumption 2 is as below.

Problem Setting 2.

Given dataset D, estimate $w_t$, $l_t$ for each t∈{1, 2, ..., m} and a fraction matrix F under the following constraints:

6. $l_t$=min(D(:, t)) for ∀t∈{1, 2, ..., m}
7. $w_t$=max(D(:, t)) for ∀t∈{1, 2, ..., m}
8. D=Fdiag($w_1, w_2, \ldots, w_m$)+(1−F)diag($l_1, l_2, \ldots, l_m$)

where, min(D(:, t)) and max(D(:, t)) are the minimum and maximum value in D(:, t). 1 is a n×m matrix of which all elements are 1. And, diag($a_1, a_2, \ldots, a_m$) is a m×m diagonal matrix of which the $i^{th}$ diagonal element is $a_i$.

Assumption 3, unlike the first two assumptions, takes noise into consideration. When data from water pixels and land pixels are random variables, the water basis and land basis cannot be determined as a simple constraint as in Problem Setting 1 and Problem Setting 2. In detail, the problem formulation under Assumption 3 is Problem Setting 3.

Given dataset D, estimate $w_t$, $l_t$ for each t∈{1, 2, ..., m} and fraction matrix F under the following constraints:

9. There are a non-trivial number of pure water and pure land pixels at any timestep.
10. D(i, t)=$w_t$F(i, t)+$l_t$(1−F(i, t))+n where n is a random noise such that $$n \sim \begin{cases} N(0, \sigma_w^2) & \text{if } D(i, t) \text{ is a pure water pixel} \\ N(0, \sigma_l^2) & \text{if } D(i, t) \text{ is a pure land pixel} \\ \text{Unknown} & \text{otherwise} \end{cases}$$

In the various embodiments of the invention, the lake extent monitoring problem is solved under the most realistic assumption (i.e., Assumption 4). The major difference in the problem that is solved by the various embodiments of the invention is that the dataset is considered to be a heterogeneous dataset. In detail, the problem is as below.

Problem Setting 4.

Given dataset D, estimate fraction matrix F under the following constraints:

11. Pure water pixels form finite clusters and pure land pixels form finite clusters as well. Pixels within each cluster share the same expected value.
12. There are a non-trivial number of pixels in each cluster (both water clusters and land clusters).
13. D(i, t)=$w_t$F(i, t)+$l_t$(1−F(i, t))+n where n is as same as the one used in Problem setting 3.

Example Embodiments

Figure 3:
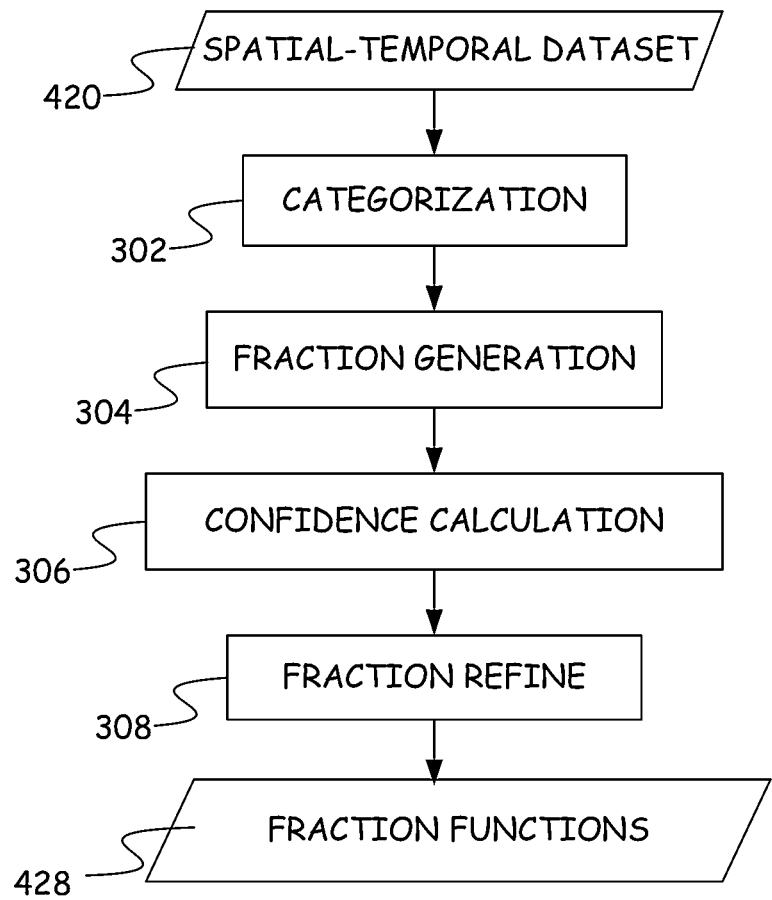
FIG. 3 provides a flow diagram for labelling satellite sensor data.
Figure 4:
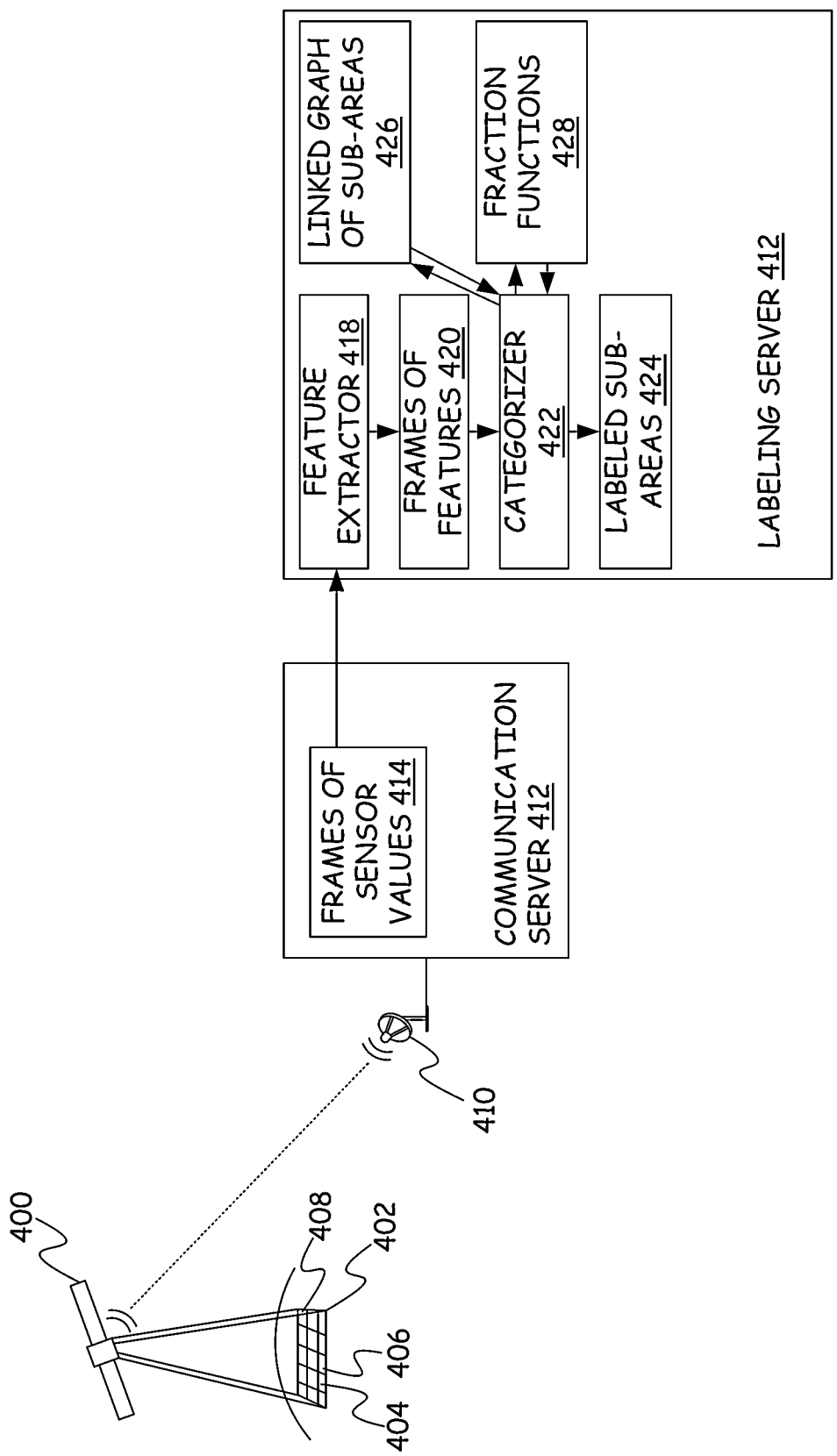
FIG. 4 provides a system diagram of a system for labelling satellite sensor data.

FIG. 3 provides a method and FIG. 4 provides a system diagram of a system used to improve the efficiency and accuracy of labeling satellite sensor data. In FIG. 4, a satellite 400, positioned in orbit above the earth and having one or more sensors, senses values for a geographic location 402 that is comprised of a plurality of sub-areas such as sub-areas 404, 406 and 408. Multiple sensors may be present in satellite 400 such that multiple sensor values are generated for each sub-area of geographic location 402. In addition, satellite 400 collects frames of sensor values for geographic location 402 with each frame being associated with a different point in time. Thus, at each point in time, one or more sensor values are determined for each sub-area in geographic location 402 creating a time series of sensor values for each sub-area. Satellite 400 transmits the sensor values to a receiving dish 410 which provides the sensor values to a communication server 412. Communication server 412 stores the sensor values as frames of sensor values 414 in a memory in communication server 412. A labeling server 416 receives frames of sensor values 414 and provides the received frames of sensor values to a feature extractor 418. Feature extractor 418 extracts one or more features for each sub-area based on the sensor values for that sub-area for a single frame. As a result, feature extractor 418 produces frames of features 420 with each frame corresponding to a point in time and each frame containing one or more feature values for each sub-area. The sensor values and feature values for a sub-area in a single frame are referred to as the values of a pixel for the frame. Thus, feature extractor 418 converts a pixel's sensor values into a pixel's feature values. Each pixel is associated with a particular sub-area at a particular time.

The frames of features 420 are provided to a categorizer 422 which forms labeled sub-areas 424 as described further below. As part of forming the labeled sub-areas, categorizer 432 generates a linked graph of sub-areas 426 as described further below. In addition, categorizer 432 forms fraction functions 428 for some of the sub-areas as described further below.

Under some embodiments, a four-step unsupervised framework (as shown in FIG. 3) is provided that generates labeled sub-areas 424 and fraction functions 428 from frames of features 420. The framework method includes: (i) sub-area categorization 302 (ii) fraction matrix generation 304 (iii) confidence calculation 306 and (iv) fraction map refinement 308. Sub-area categorization 302 partitions all sub-areas into three categories, static water (($\mathcal{W}$)), static land (($\mathcal{L}$)) and others ($\chi$, which includes dynamic sub-areas that transition between land and water, and static sub-areas that are mixed). The fraction matrix, which represents the percentage area of water for each pixel at any time, is generated in step 304 using sub-area categories obtained from step 302. Elements in the initial fraction matrix are often contaminated by noise and outliers. Hence, in step 306, a confidence score is assigned for each fraction. Utilizing the confidence matrix and temporal correlation in the fraction scores of each location, the fraction matrix is refined and the final fraction functions 428 is output in step 308. In the rest of this section, we will discuss each step in detail.

Sub-Area Categorization

Sub-areas can be labelled as static sub-areas (locations that do not change their categories over time) and dynamic sub-areas (locations that do change their categories over time). In categorization step 302, according to some embodiments, a graph-based method is used to cluster sub-areas into multiple groups such that sub-areas within the same cluster belong to the same category. Note that the sub-areas under the same category are allowed to be partitioned into different clusters (i.e. sub-areas within one category can be heterogeneous).

Categorization helps the algorithm in two aspects. First, after categorization, stable water sub-areas and stable land sub-areas will be given a ($\mathcal{W}$) or ($\mathcal{L}$) label directly. Since the graph-based clustering method utilizes spatial and temporal information together in a natural way, its performance is robust to noise and outliers, even when a given time step is highly contaminated by noise and outliers. Second, the ($\mathcal{W}$) and ($\mathcal{L}$) sub-areas can be used as basis signals which will be used later to assign a fraction for the $\chi$ sub-areas.

Figure 5:
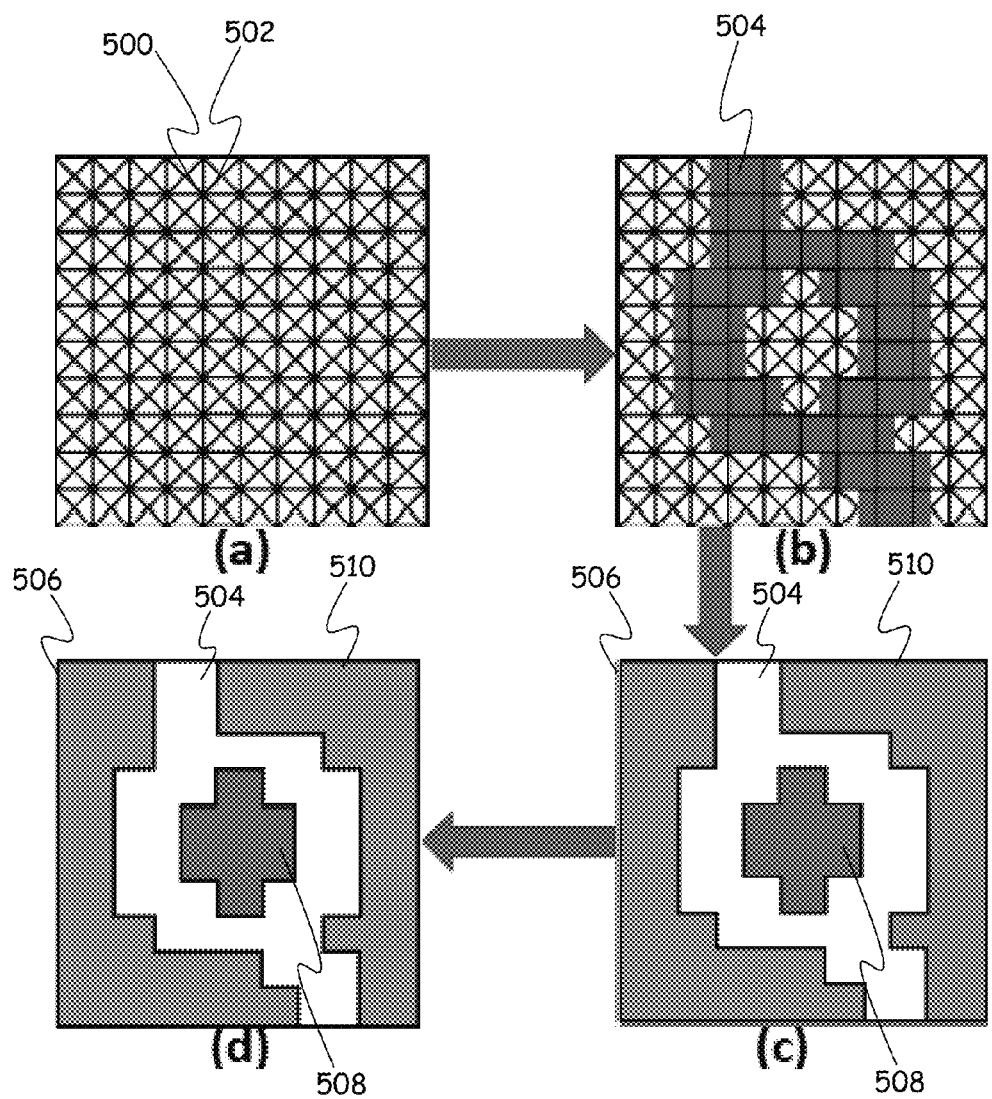
FIG. 5 provides graphs showing the formation of clusters using linked graphs.

The key steps in categorization are shown in FIG. 5. First, a spatial graph 426 (FIG. 4) is created of all the sub-areas, in which every node, such as node 500, represents a sub-area and is connected with its 8 adjacent neighbors by a respective edge, such as edge 502, as shown in FIG. 5(a). Then, each edge in the graph is checked. If the data shows that the two nodes linked by an edge do not belong to the same category, the edge is deleted. Otherwise, the edge is preserved. Transition ($\chi$) sub-areas are then detected from the remaining graph. In FIG. 5(b), remaining edges are shown as black lines and $\chi$ sub-areas are shown in shaded area 504. Next, each non-$\chi$ pixel is clustered with its 4-neighbors as long as its 4-neighbor is not a $\chi$ sub-area. In this context, a 4-neighbor is a sub-area located on one of the four sides of the sub-area and excludes neighbors located at the corners of the sub-area. The clustered result of the example is shown in FIG. 5(c), showing three clusters 506, 508 and 510 and $\chi$ sub-areas 504. Finally, a label is assigned to each cluster based on a heuristic derived from domain knowledge. The final output of the categorization step is shown in FIG. 5(d).

Below, the criterion for deleting an edge, the method of determining $\chi$ sub-areas, and the labelling of each cluster are discussed.

Criterion for Deleting an Edge

Any edge in the graph is connected to two nodes that represent two sub-areas. Since nodes that are linked together will be grouped into one cluster, an edge needs to be deleted if it connects two nodes that do not belong to the same category. In order to account for the heterogeneity within each category (see the problem formulation in Section 2), edges that link two nodes from different types of a category are also deleted. By assuming that nodes from the same cluster in the same category have similar values and a similar level of noise contamination, links are preserved by comparing the distribution of the two nodes' temporal observations. An edge is deleted if the two distribution are significantly different. The following hypothesis test is used to judge whether or not the two distribution are different:

$$H_0: F(D(i,:)) = F(D(j,:))$$

$$Ha: F(D(i,:)) \neq F(D(j,:))$$

where F (D(k, :)) is the distribution of the $k^{th}$ object in dataset D created using all its temporal observations. By using this criterion, the temporal observations of any sub-area are assumed to be i.i.d. Although this assumption does not entirely hold in reality because of the temporal correlation that exists in the dataset, it is a reasonable approximation because the temporal correlation of water sub-areas is not high in most cases. The two-sample Kolmogorov-Smirnov test (KS test) is used for this hypothesis test. The KS test is nonparametric and hence is suitable for the analysis.

Heuristics to Determine $\chi$ Pixels

Figure 6:
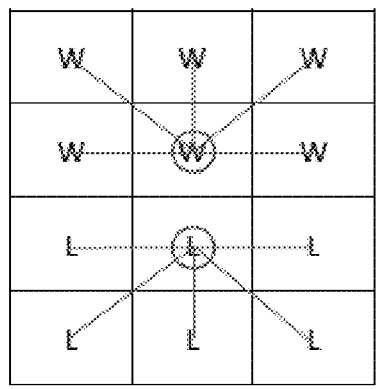
FIG. 6 provides graphs showing rules for breaking links in a linked graph.
Figure 6:
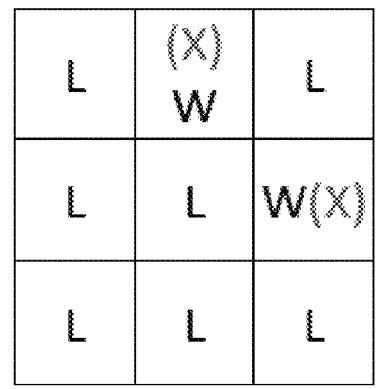
Figure 6:
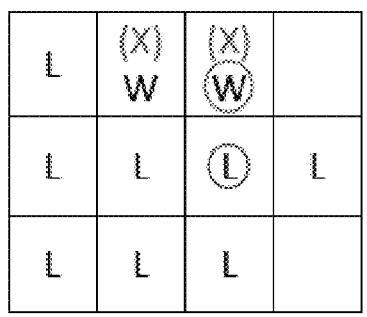
Figure 6:
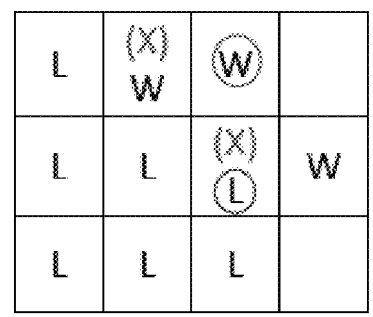

Any node that is connected to fewer than k other nodes is labeled as $\chi$. In the various embodiments, k=6 is used to avoid having any 4-neighbor of a stable water sub-area (($\mathcal{W}$)) be a stable land sub-area (($\mathcal{L}$)). When k<6, the above condition cannot be achieved, as is shown in the following examples. FIG. 6(a) shows a scenario where the circled water sub-area has five water neighbors and the circled land sub-area has five land neighbors. In this scenario, when k=5, both the circled water sub-area and the circled land sub-area will not be labeled as $\chi$. Hence, the condition is not met. When k=6, a sub-area is not considered to be $\chi$ if at most two of its neighbors is not connected with it (i.e., two of the 8-neighbors belong to the other category). Let us assume that the target sub-area is a land sub-area and it has two water neighbors. If the two water neighbors are not adjacent to each other, as shown in FIG. 6(b), both of the two water sub-areas will be labeled as $\chi$. Hence, the target sub-area will not have ($\mathcal{W}$) in its 4-neighbors. If the two water sub-areas are adjacent to each other as shown in FIG. 6(c) and FIG. 6(d), the one which is on top of it will be labeled as $\chi$. When the right neighbor of the circled land sub-area is another land sub-area (as shown in FIG. 6(c)), the circled water sub-area will have at least three land neighbors and hence it is a $\chi$ sub-area. In the other situation, if the right neighbor of the circled land sub-area is a water sub-area, the land sub-area itself will be labelled as a $\chi$ since it has more than three water neighbors. In both scenarios, a land sub-area cannot have a water sub-area as one of its 4-neighbors.

Heuristics to Label a Cluster

From domain knowledge, it is known that variables used in the various embodiments (TCWETNESS) usually have values larger than −1000 for water. On the other hand, land pixels usually have values smaller than −1000. Hence, a cluster is labeled as land if the median of all observations in a cluster is smaller than −1000. Similarly, a cluster is labelled as water if the median of all observations is larger than −1000.

Fraction Generation

In this step, a fraction for each pixel is computed at any time. In the previous step, the dataset was partitioned into three disjoint categories: static water sub-areas (($\mathcal{W}$)), static land sub-areas (($\mathcal{L}$)) and $\chi$ sub-areas. For each ($\mathcal{W}$) sub-area, we directly assign a fraction of 1 for all time steps. Similarly, we assign a fraction of 0 for all time steps to each ($\mathcal{L}$) sub-area. The major task in the fraction generation step is to compute fraction values for $\chi$ pixels.

Let ($\mathcal{W}$)$_1$, ($\mathcal{W}$)$_2$ . . . ($\mathcal{W}$)$_k$ be k water clusters formed from the categorization step. Similarly, let ($\mathcal{L}$)$_1$, ($\mathcal{L}$)$_2$ . . . ($\mathcal{L}$)$_g$ be g land clusters. We denote $\hat{\omega}_i(t)$ and $\hat{l}_j(t)$ as the representation of cluster ($\mathcal{W}$)$_i$ and cluster ($\mathcal{L}$)$_j$ at time t, respectively. By assuming that observations in each cluster have the same expected value at any time, $\hat{\omega}_i(t)$ and $\hat{l}_j(t)$ can be estimated as a trimmed mean of observations in ($\mathcal{W}$)$_i$ and ($\mathcal{L}$)$_j$ at time t. In one embodiment, a 10% trimmed mean is used.

When calculating the fraction value for any $\chi$ pixel, the water and land basis are first decided. From domain knowledge it is known that there is strong spatial correlation within the data. Hence, basis which are learned from clusters which are spatially close to the given pixel's sub-area are preferred.

Therefore, we search for one water cluster (($\mathcal{W}$)$_i$) and one land cluster ($\mathcal{L}$)$_j$ that are spatially closest to the given $\chi$ sub-area. Then, the fraction function 428 of any $\chi$ pixel x at time t can be calculated as:

$$f(x, t) = \begin{cases} 1 & \text{if } x(t) \geq \hat{\omega}_i(t) \\ \dfrac{x(t) - \hat{l}_j(t)}{\hat{\omega}_i(t) - \hat{l}_j(t)} & \text{if } \hat{\omega}_i(t) > x(t) > \hat{l}_j(t) \\ 0 & \text{if } x(t) \leq \hat{l}_j(t) \end{cases}$$

However, this score tends to provide a lower water fraction to $\chi$ pixels. The main reason is that the variance of land clusters tends to be much larger than the variance of water clusters. To overcome this problem, the fraction function 428 is modified by taking the variance of each distribution into consideration. Thus, we modify the fraction function 428 as:

$$f(x, t) = \begin{cases} 1 & \text{if } x(t) \geq \hat{\omega}_i(t) \\ \dfrac{\dfrac{x(t) - \hat{l}_j(t)}{\sigma_{\mathcal{L}_j}(t)}}{\dfrac{\hat{\omega}_i(t) - x(t)}{\sigma_{\mathcal{W}_i}(t)} + \dfrac{x(t) - \hat{l}_j(t)}{\sigma_{\mathcal{L}_j}(t)}} & \text{if } \hat{\omega}_i(t) > x(t) > \hat{l}_j(t) \\ 0 & \text{if } x(t) \leq \hat{l}_j(t) \end{cases}$$

where $\sigma(\mathcal{L})_j(t)$ and $\sigma(\mathcal{W})_i(t)$ are the standard deviation of observations in cluster ($\mathcal{L}$)$_j$ and ($\mathcal{W}$)$_j$ respectively.

Confidence Calculation

In the fraction generation step, the fraction function 428 computed for each $\chi$ pixel is determined by a water basis $\hat{\omega}_i(t)$ and a land basis $\hat{l}_j(t)$. When the distribution of the water cluster ($\mathcal{W}$)$_i$ and land cluster ($\mathcal{L}$)$_j$ are too similar to each other, the fraction calculated based on them is not trustworthy. Hence, we developed a confidence score for each $\chi$ pixel, which is calculated as the probability that any basis is not observed in the other distribution. Specifically, the confidence score for the pixel at time t is measured as:

$$\min(p(\hat{\omega}_i(t) \notin (\mathcal{L})_j(t)), p(\hat{l}_j(t) \notin (\mathcal{W})_i(t)))$$

where $p(a \notin \chi)$ is the probability of $\alpha$ does not belong to $\chi$ and $$p(a \notin \chi) = p(|x - E(x)| < a | x \in \chi)$$

Fraction Refinement

The confidence score and temporal correlation in the fraction score of each sub-area are used for refining the fraction matrix. In detail, when one of the following two scenarios occurs, we consider the fraction value to be invalid:

14. When the information is not enough (i.e., its confidence score $< \delta_d$), we consider the fraction value as invalid.

15. When a spike happens in the score, the fraction value is considered to be invalid.

After applying the above rules to the fraction matrix, we label each fraction $f_o$ as either valid or invalid. For each invalid fraction, we search its temporal neighborhood and find the most recent historical valid fraction ($f_h$) and the subsequent further valid fraction number ($f_f$). The invalid fraction is then replaced with:

$$f_o = 0.5(f_f + f_h)$$

Experimental Results

The embodiments were compared against baseline method of the prior art on three lakes that show high seasonal variation in their area extent since the year 2002. Specifically, two regions in the Amazon in Brazil: Coari (Lago de Coari) and Taciuala (Lago Grande) and one region in Mali in Africa (Lac de Sélingué). Each region includes both water pixels and land pixels.

Data

The surface water area is monitored based on a "wetness index" obtained from the tasseled cap transformation. The tasseled cap transformation creates three orthogonal features that represents different physical parameters of the land surface. The feature that represent "wetness" is used in the various embodiments and is referred as TCWETNESS.

The TCWETNESS can be obtained using multispectral data products from MODIS, which is available for public download. In some embodiments, TCWETNESS is obtained from frames of sensor values 414 consisting of Bands 1 and 2 from the MODIS spectral reflectance data product (MYD09Q1) which has 250 m spatial resolution, and Bands 3 through 7 from (MCD43A4) which has 500 m spatial resolution; all bands have a temporal frequency of 8 days. Resampling Bands 3 through 7 to 250 spatial resolution, the TCWETNESS dataset is an 8-day 250 m spatial-temporal dataset, which is available from July 2002 till present.

Evaluation Setup

Due to the considerable expense involved, gold standard validation sets for surface water changes over time are not available. In the various embodiments, two types of data are used to assess the performance of any surface water monitoring algorithm: (i) fraction maps manually extracted from high-resolution Land-sat images (ii) height of the water surface obtained from satellite radar altimetry.

Landsat-5 is one of the satellites in a series of 8 Land-sat satellites which have maintained a continuous record of the Earth's surface since 1972. Thematic Mapper (TM) sensor onboard Landsat 5 is a multi-spectral radiometric sensor that records seven spectral bands with varying spatial resolutions. Bands 1 through 5 and Band 7 are available at 30 m resolution and Band 6 (the thermal band) is available at 120 m spatial resolution. Due to relatively high spatial resolution, it can be used to manually delineate a lake boundary with high accuracy. A validation fraction maps (LSFRACTION) is obtained by resampling this layer to 250 m resolution, which matches the resolution of TCWETNESS.

The number of available LSFRACTION is limited due to the extensive human effort required for LSFRACTION generation. Therefore, instead of evaluating algorithms using LSFRACTION exhaustively, we verify their correctness based on two intelligently selected dates for each area. Specifically, human experts create one LSFRACTION on the date when the lake is at its peak height and another LSFRACTION on the date when lake height is at its minimum. After binarizing the scores and fractions provided by the algorithms and LSFRACTION, embodiments are evaluated on the two dates when LSFRACTION is available. In particular, different methods are compared using both $F_f$-measure and accuracy. Note that since surface height and water extent are positively correlated for any lake, the two LSFRACTION also correspond to the maximum and minimum lake extent. Therefore, pixels that are marked as pure land (the water fraction is 0) in both LSFRACTION are considered as true static land ($T_l$). Similarly, pixels that are marked as pure water (the water fraction is 1) in both LSFRACTION are considered as true static water ($T_w$). Following this logic, we obtain labels of these pixels at any time step.

Height information for some lakes in the world is available from the Laboratoire d'Etudes en Géophysique et Océanographie Spatiales (part of the French Space Agency) and the U.S. Department of Agriculture. The height value in the dataset is measured based on the return signal of a radar pulse, which is robust to cloud cover and is able to take night-time measurements. A recent inter-comparison and validation study found these datasets to be accurate within centimeters and hence is sufficient to be used in an evaluation. When the height of the lake surface increases, the surface water extent of the lake cannot decrease, which implies that the water fraction of any pixel in the lake cannot decrease. Hence, the fraction of any pixel in the lake is a monotonic function with respect to the height of the given lake. Utilizing this physical constraint, the correctness of the fraction result can be verified by examining if the monotonic relationship has been broken. Specifically, the Kendall Tau correlation is used in the evaluation. Before introducing Kendall Tau (KT), we first define concordant pairs and discordant pairs. Assume that fraction calculated for time $t_a$ and $t_b$ is a and b. Their corresponding height information is $h_a$ and $h_b$. a and b is a concordant pair iff $$(a-b)(h_a-h_b) \geq 0$$

Any pair which is not concordant is a discordant pair. Kendall Tau (KT) is then defined as $$KT = \frac{N_c - N_d}{N_c + N_d}$$

where $N_c$ is the number of concordant pairs and $N_d$ is the number of discordant pairs. Ideally, KT should equal 1 if all the scores are correct.

Results

Binarizing the fractions calculated from any algorithm and the fractions given in LSFRACTION, we can compare the performance of the various embodiments and a baseline method at the dates when LSFRACTION is available. Table 1 and Table 2 show their performance on the three lakes under the study.

TABLE 1

F measure and Accuracy for all locations.

| | | F measure | | Accuracy | |
|---|---|---|---|---|---|
| | | Baseline | Embodiment | Baseline | Embodiment |
| Coari | day 1 | 0.4241 | 0.9268 | 0.4403 | 0.9573 |
| | day 2 | 0.9410 | 0.9453 | 0.9613 | 0.9649 |
| Taciuala | day 1 | 0.7729 | 0.7248 | 0.9757 | 0.9792 |
| | day 2 | 0.3972 | 0.7632 | 0.9203 | 0.9846 |
| Selingue | day1 | 0.5890 | 0.7525 | 0.9249 | 0.9663 |
| | day 2 | 0.8721 | 0.8247 | 0.9619 | 0.9578 |

TABLE 2

Mean KT value for all locations.

| | Baseline | Embodiments |
|---|---|---|
| Coari | 0.81 | 0.97 |
| Taciuala | 0.41 | 0.97 |
| Selingue | 0.90 | 0.96 |

Figure 7:
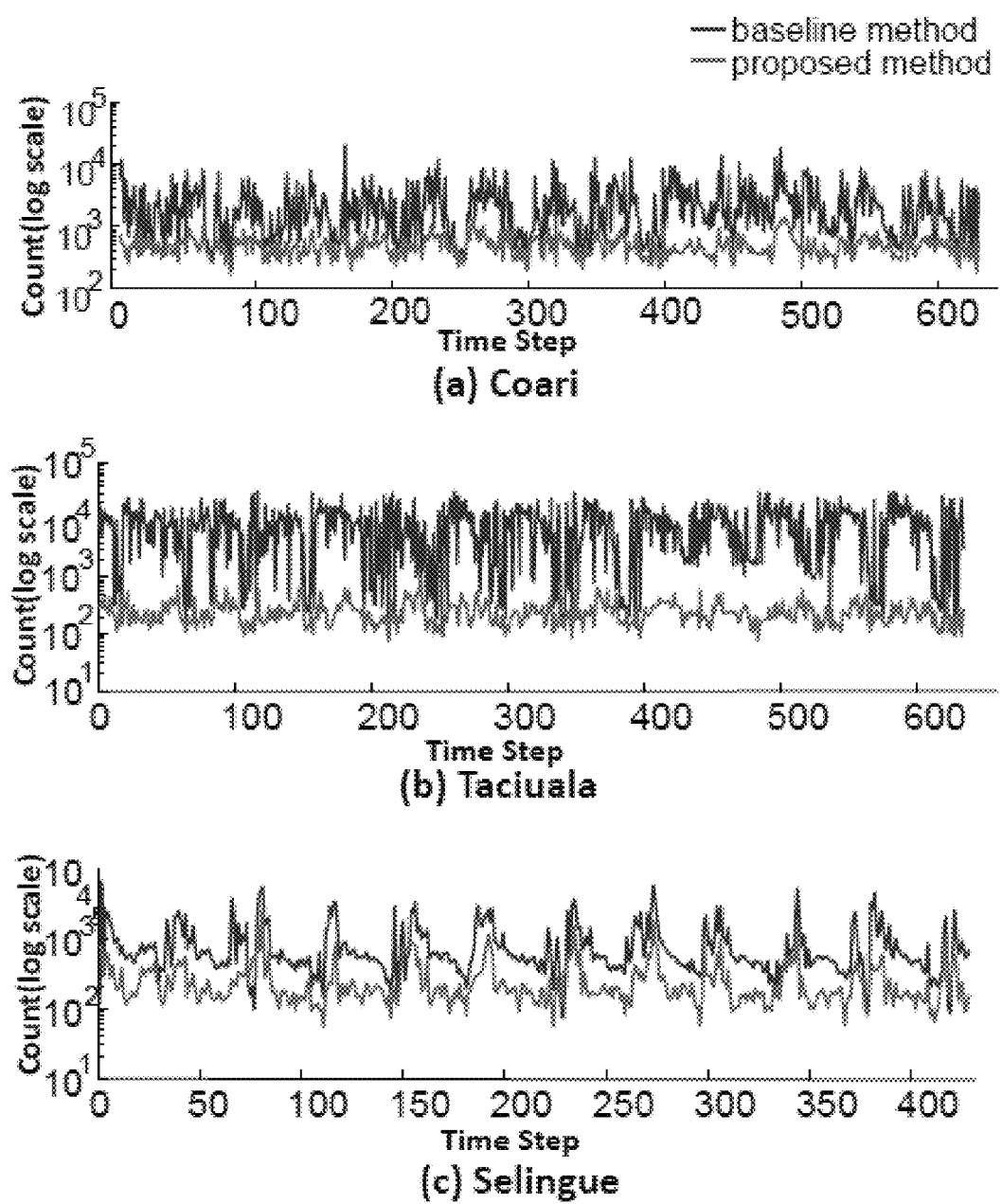
FIG. 7 provides graphs of misclassified sub-area counts for a collection of locations using a baseline method and a method of embodiments described herein.

From two LSFRACTION data per lake, we know that $T_w$ pixels should be labelled as water and $T_l$ pixels should be labelled as land for all time steps. Hence, we can evaluate the performance of the proposed method and the baseline method for each time step using $T_w$ and $T_l$ pixels. FIG. 7 shows the count of misclassified pixels at each time step for the baseline method (top lines) and the proposed method (bottom lines). We use log scale to the count number to show results from both methods clearly. From the figure, we can observe that the proposed method in general has less misclassification error than the baseline method.

A better algorithm will provide a higher F-measure, higher accuracy, larger mean KT value and less misclassification error. Table 1, Table 2 and FIG. 7 show that the performance of the various embodiments is consistently better than the baseline method. By comparing the performance of the two algorithms on different dates, we notice that the proposed method is more consistent than the baseline method.

Date Specific Performance of Baseline Approach

Figure 8:
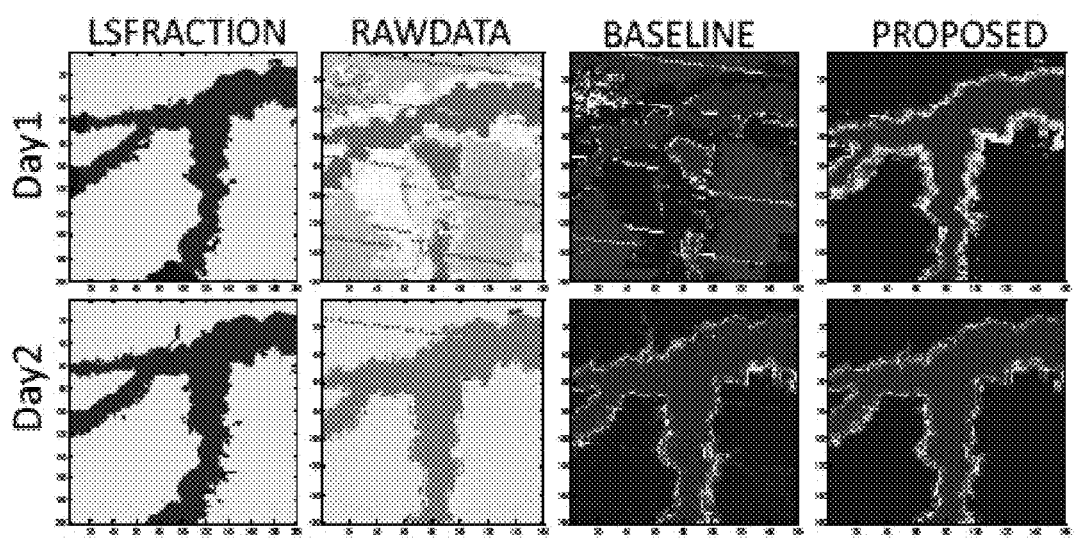
FIG. 8 shows input data and output labelling for a particular area on two different dates.

The baseline method classifies water and land pixels for each time step independently. Hence, when the quality of an image is good, it performs well. However, when the quality of the image is bad, its performance deteriorates. On the contrary, the various embodiments use temporal information and hence are robust to noise even when the image is largely contaminated by noise and outliers. FIG. 8 shows data from Coari region for two different dates. The first row shows the landsat image, the MODIS image and results from both the baseline method and the proposed method on day 1 when the MODIS image does not have good quality. From both FIG. 8 and Table 1, it is observed that the various embodiments still work reasonable but the baseline method does not perform well. In the second row, corresponding images on day 2 when the MODIS image quality is good are provided. Here, both methods show good performance when compared to corresponding LSFRACTION.

Evaluation of ($\mathcal{W}$) and ($\mathcal{L}$)

As shown in FIG. 3, the first step of the proposed method is to partition the dataset into two sets (i) S sub-areas (static sub-areas that includes ($\mathcal{W}$), i.e., static water sub-areas, and ($\mathcal{L}$), i.e., static land sub-areas) and (ii) $\chi$ sub-areas (all the sub-areas that are not static). Fractions of S sub-areas are given directly after the first step. Their information is used in the remaining steps as well. Hence, the performance of categorization is critical for the proposed method.

Table 3 shows the confusion matrix of ($\mathcal{W}$), ($\mathcal{L}$) and $\chi$ compared with $T_w$, $T_l$ and true dynamic sub-areas $D_x$ (i.e., sub-areas that are not $T_l$ and not $T_w$). From table 3 it can be seen that the categorization under the various embodiments is good since there is no $T_l$ sub-areas labelled as ($\mathcal{W}$) and no $T_w$ sub-areas labelled as ($\mathcal{L}$).

TABLE 3

The confusion matrix of categorization results.

|  |  | $T_w$ | $D_x$ | $T_l$ |
|---|---|---|---|---|
| Coari | W | 5011 | 8 | 0 |
|  | X | 1853 | 1654 | 1804 |
|  | L | 0 | 4 | 14804 |
| Taciuala | W | 256 | 81 | 0 |
|  | X | 483 | 1190 | 1903 |
|  | L | 0 | 4 | 10545 |
| Selingue | W | 453 | 183 | 0 |
|  | X | 1245 | 2875 | 15016 |
|  | L | 0 | 17 | 15308 |

Table 4 provides the F-measure and accuracy of classification results from the various embodiments and the baseline method for S pixels. Two observations can be made from the table. First, the various embodiments for categorization are reliable even when the data quality is not good (e.g., the day 1 in Coari region as shown in FIG. 8). Second, without using temporal information properly, baseline method performs badly. As a conclusion, ($\mathcal{W}$), and ($\mathcal{L}$) pixels detected from the various embodiments are robust to noise and outliers and can be used reliably in the later steps in the proposed method.

TABLE 4

F measure and Accuracy for S pixels

|  |  | F measure | | Accuracy | |
|---|---|---|---|---|---|
|  |  | Baseline | Embodiments | Baseline | Embodiments |
| Coari | day 1 | 0.3877 | 1.0000 | 0.3882 | 1.0000 |
|  | day 2 | 0.9991 | 1.0000 | 0.9995 | 1.0000 |
| Selingue | day 1 | 0.9339 | 0.9985 | 0.9984 | 1.0000 |
|  | day 2 | 0.2161 | 0.9629 | 0.9270 | 0.9992 |
| Taciuala | day 1 | 0.5175 | 0.8822 | 0.9427 | 0.9918 |
|  | day 2 | 0.9910 | 0.9992 | 0.9992 | 0.9999 |

4.3.3 Evaluation of $\chi$ Pixels

Fraction values of $\chi$ pixels rely on the performance of categorization as well as the proposed scoring mechanism. Through our previous analysis, we have already demonstrated the accuracy of the categorization step is high. Hence, by analysing $\chi$ pixels, we are evaluating the performance of the scoring mechanism. Table 5 and Table 6 provide F-measure, accuracy and mean KT values for all $\chi$ pixels. Notice that the various embodiments are better than the baseline method in Coari and Taciuala in day 1. Otherwise, they perform similarly.

To understand the performance on $\chi$ pixels, we further split $\chi$ pixels into two sets, $\chi_S$ (i.e., $\chi$ pixels that are static based on LSFRACTION) and $X_d$ (i.e., $\chi$ pixels that are true dynamic pixels according to LSFRACTION). Table 7 and Table 8 show F-measure, accuracy and mean KT values of $\chi_s$ pixels. We notice that the various embodiments consistently perform better than the baseline method. S pixels contain similar information with $\chi_s$ pixels because $\chi_s$ are static land or static water in the reality. Hence, the various embodiments are able to label $\chi_s$ correctly by borrowing information from S pixels.

The various embodiments and the baseline method do not work well in the $\chi_d$ pixels. The F-measure, accuracy and mean KT value of these pixels are given in Table 9 and Table 10. These pixels are difficult to estimate correctly for many reasons. Most importantly, ($\mathcal{L}$) and ($\mathcal{W}$) may not contain enough information to describe these dynamic pixels. When these locations are covered by water, they are shallow water pixels. Various studies have claimed that signals from shallow water pixels are different from the ones from deep water region. Besides, when these pixels changes to land, their wetness may still be higher than real stable land pixels.

TABLE 5

F measure and Accuracy for $\chi$ pixels.

|  |  | F measure | | Accuracy | |
|---|---|---|---|---|---|
|  |  | Baseline | Embodiments | Baseline | Embodiments |
| Coari | day 1 | 0.5739 | 0.7731 | 0.6278 | 0.8039 |
|  | day 2 | 0.8520 | 0.8566 | 0.8232 | 0.8380 |
| Selingue | day 1 | 0.7336 | 0.6287 | 0.7828 | 0.8028 |
|  | day 2 | 0.6854 | 0.6833 | 0.8737 | 0.8843 |
| Taciuala | day1 | 0.6173 | 0.7152 | 0.9111 | 0.9467 |
|  | day 2 | 0.8555 | 0.7938 | 0.9327 | 0.9248 |

TABLE 6

Mean KT value for χ pixels.

| | Baseline | Embodiments |
|---|---|---|
| Coari | 0.79 | 0.86 |
| Taciuala | 0.65 | 0.87 |
| Selingue | 0.89 | 0.93 |

TABLE 7

F measure and Accuracy for $\chi_s$ pixels.

| | | F measure | | Accuracy | |
|---|---|---|---|---|---|
| | | Baseline | Embodiments | Baseline | Embodiments |
| Coari | day 1 | 0.6231 | 0.8681 | 0.6166 | 0.8687 |
| | day 2 | 0.8994 | 0.9274 | 0.8890 | 0.9232 |
| Selingue | day 1 | 0.7319 | 0.8119 | 0.8554 | 0.9308 |
| | day 2 | 0.8065 | 0.8184 | 0.9199 | 0.9304 |
| Taciuala | day1 | 0.7463 | 0.8839 | 0.9496 | 0.9811 |
| | day 2 | 0.8303 | 0.9519 | 0.9687 | 0.9927 |

TABLE 8

Mean KT value for $\chi_s$ pixels

| | Baseline | Embodiments |
|---|---|---|
| Coari | 0.81 | 0.98 |
| Taciuala | 0.40 | 0.98 |
| Selingue | 0.90 | 0.96 |

TABLE 9

F measure and Accuracy of $\chi_d$ pixels.

| | | F measure | | Accuracy | |
|---|---|---|---|---|---|
| | | Baseline | Embodiments | Baseline | Embodiments |
| Coari | day 1 | 0.4300 | 0.4838 | 0.6261 | 0.6465 |
| | day 2 | 0.7834 | 0.7450 | 0.6927 | 0.6651 |
| Selingue | day 1 | 0.7558 | 0.5489 | 0.6635 | 0.5875 |
| | day 2 | 0.5636 | 0.5353 | 0.7012 | 0.7059 |
| Taciuala | day1 | 0.4043 | 0.4005 | 0.6569 | 0.7128 |
| | day 2 | 0.8623 | 0.6884 | 0.7893 | 0.6393 |

TABLE 10

Mean KT value for $\chi_d$ pixels.

| | Baseline | Embodiments |
|---|---|---|
| Coari | 0.75 | 0.81 |
| Taciuala | 0.78 | 0.81 |
| Selingue | 0.86 | 0.86 |

CONCLUSION

The various embodiments provide an unsupervised method for monitoring the lake dynamics. In detail, these embodiments first utilize a graph based clustering method to partition data into three categories, static water, static land and others. The fraction matrix, which represents the percentage area of water for each pixel at any time is then generated based on the partition results. A confidence value for each fraction is also provided. Utilizing the confidence values, we refine the fraction matrix and create the final fractions. We also developed a methodology for quantitative evaluation of the algorithm performance using a combination of independent validation data and physics-guided labelling. From our evaluation, we demonstrate that the various embodiments are more accurate and robust than the state-of-art method.

By studying the experimental results in detail, it is noticed that the various embodiments perform well in the static sub-areas (i.e., the sub-areas that are always covered by water or by land). The embodiments detect stable water ( ($\mathcal{W}$) ) sub-areas and stable land (($\mathcal{L}$)) sub-areas with high accuracy by utilizing both temporal and spatial information. The static sub-areas within χ are also classified with high accuracy because they share similar information with the pixels that are in ($\mathcal{W}$) and ($\mathcal{L}$).

The embodiments described above improve the performance of computing systems used to label sensor data by allowing the computing systems to operate more efficiently and more accurately. In particular, in prior art unsupervised labeling systems, K-means clustering has been used to cluster sub-areas that surround a known water area. Such K-means clustering is an iterative technique requiring repetitive identification of possible clusters to find the best set of clusters that minimizes differences within the clusters. Such iterative techniques require a large amount of processing time because the clustering must be repeated. In the embodiments described above, such iterations are no longer needed since the transitional sub-areas χ can be identified in a single pass and the fraction functions for each sub-area χ can be identified in a single pass. Thus, the embodiments above reduce the amount of processing a system must perform in order to label satellite sensor data with land cover labels.

In addition, as shown above, the present computing system is more accurate than existing computing systems and thus is better able to convert satellite data into land cover labels. The accurate conversion of sensor data to labels is a highly technical function that cannot be performed by humans because it is difficult for humans to interpret the sensor values themselves, to covert those sensor values into features representing wetness, and to convert the features of wetness into proper labels. Furthermore, the overwhelming amount of data involved makes it impractical or impossible for humans to perform the functions described above. As such, the embodiments above represent technical solutions to technical problems.

Figure 9:
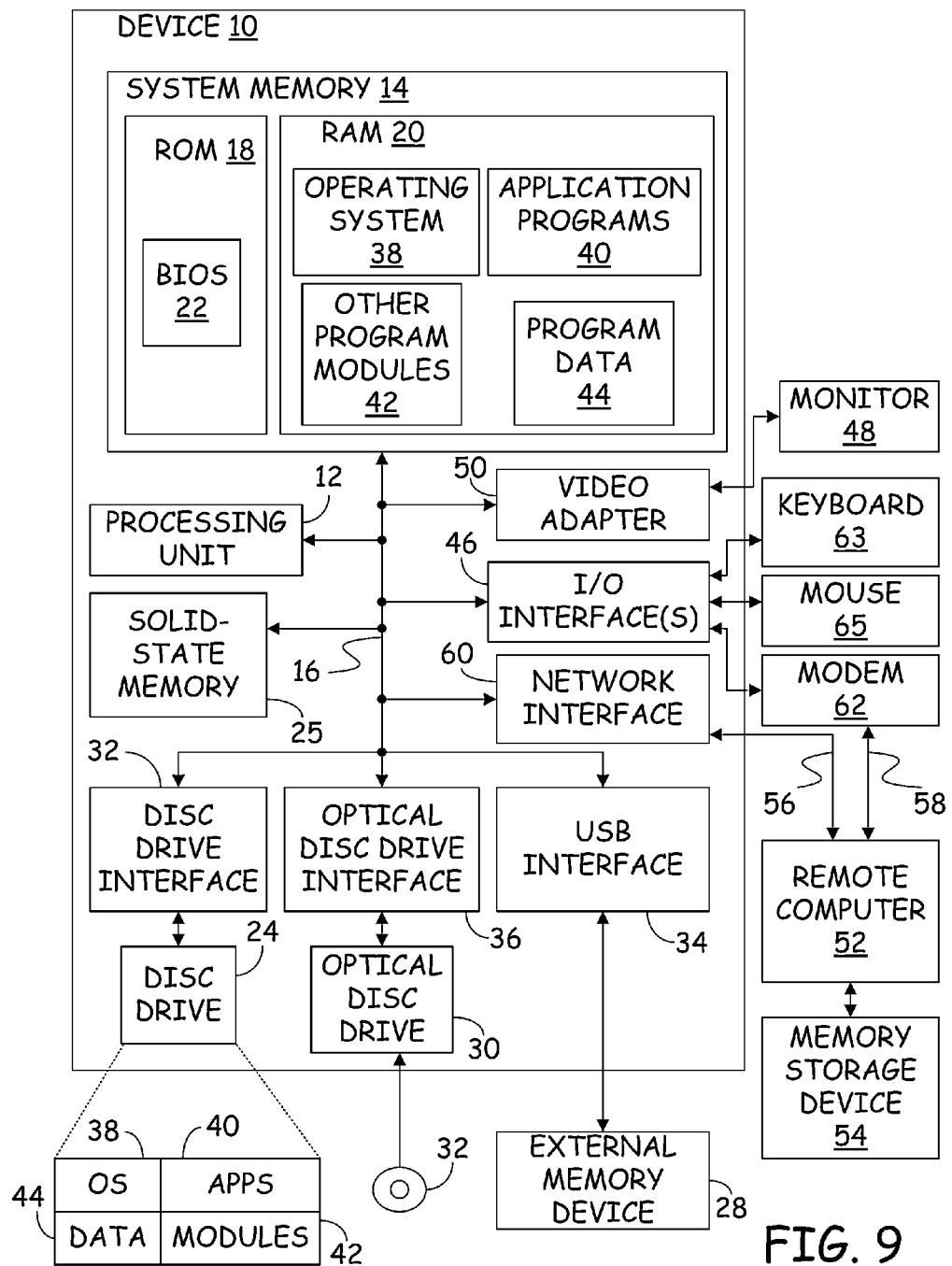
FIG. 9 provides a block diagram of a computing system that can be used to implement the various embodiments.

An example of a computing device 10 that can be used as a server and/or client device in the various embodiments is shown in the block diagram of FIG. 9. For example, computing device 10 may be used to perform any of the steps described above. Computing device 10 of FIG. 9 includes a processing unit (processor) 12, a system memory 14 and a system bus 16 that couples the system memory 14 to the processing unit 12. System memory 14 includes read only memory (ROM) 18 and random access memory (RAM) 20. A basic input/output system 22 (BIOS), containing the basic routines that help to transfer information between elements within the computing device 10, is stored in ROM 18.

Embodiments of the present invention can be applied in the context of computer systems other than computing device 10. Other appropriate computer systems include handheld devices, multi-processor systems, various consumer electronic devices, mainframe computers, and the like. Those skilled in the art will also appreciate that embodiments can also be applied within computer systems wherein tasks are performed by remote processing devices that are linked through a communications network (e.g., communication utilizing Internet or web-based software systems). For example, program modules may be located in either local or remote memory storage devices or simultaneously in both local and remote memory storage devices. Similarly, any storage of data associated with embodiments of the present invention may be accomplished utilizing either local or remote storage devices, or simultaneously utilizing both local and remote storage devices.

Computing device 10 further includes a hard disc drive 24, a solid state memory 25, an external memory device 28, and an optical disc drive 30. External memory device 28 can include an external disc drive or solid state memory that may be attached to computing device 10 through an interface such as Universal Serial Bus interface 34, which is connected to system bus 16. Optical disc drive 30 can illustratively be utilized for reading data from (or writing data to) optical media, such as a CD-ROM disc 32. Hard disc drive 24 and optical disc drive 30 are connected to the system bus 16 by a hard disc drive interface 32 and an optical disc drive interface 36, respectively. The drives, solid state memory and external memory devices and their associated computer-readable media provide nonvolatile storage media for computing device 10 on which computer-executable instructions and computer-readable data structures may be stored. Other types of media that are readable by a computer may also be used in the exemplary operation environment.

A number of program modules may be stored in the drives, solid state memory 25 and RAM 20, including an operating system 38, one or more application programs 40, other program modules 42 and program data 44. For example, application programs 40 can include instructions for performing any of the steps described above including feature extractor 418, and categorizer 422. Program data can include any data used in the steps described above including frames of sensor values 414, frames of feature values 420, linked graphs of sub-areas 426, fraction functions 428 and labeled sub-areas 424.

Input devices including a keyboard 63 and a mouse 65 are connected to system bus 16 through an Input/Output interface 46 that is coupled to system bus 16. Monitor 48 is connected to the system bus 16 through a video adapter 50 and provides graphical images to users. Other peripheral output devices (e.g., speakers or printers) could also be included but have not been illustrated. In accordance with some embodiments, monitor 48 comprises a touch screen that both displays input and provides locations on the screen where the user is contacting the screen.

Computing device 10 may operate in a network environment utilizing connections to one or more remote computers, such as a remote computer 52. The remote computer 52 may be a server, a router, a peer device, or other common network node. Remote computer 52 may include many or all of the features and elements described in relation to computing device 10, although only a memory storage device 54 has been illustrated in FIG. 9. The network connections depicted in FIG. 9 include a local area network (LAN) 56 and a wide area network (WAN) 58. Such network environments are commonplace in the art.

Computing device 10 is connected to the LAN 56 through a network interface 60. Computing device 10 is also connected to WAN 58 and includes a modem 62 for establishing communications over the WAN 58. The modem 62, which may be internal or external, is connected to the system bus 16 via the I/O interface 46.

In a networked environment, program modules depicted relative to computing device 10, or portions thereof, may be stored in the remote memory storage device 54. For example, application programs may be stored utilizing memory storage device 54. In addition, data associated with an application program may illustratively be stored within memory storage device 54. It will be appreciated that the network connections shown in FIG. 9 are exemplary and other means for establishing a communications link between the computers, such as a wireless interface communications link, may be used.

Although elements have been shown or described as separate embodiments above, portions of each embodiment may be combined with all or part of other embodiments described above.

Although the present invention has been described with reference to preferred embodiments, workers skilled in the art will recognize that changes may be made in form and detail without departing from the spirit and scope of the invention.

What is claimed is:

1. A method of reducing processing time when assigning geographic areas to land cover labels using satellite sensor values, the method comprising:
    a processor receiving a feature value for each pixel in a time series of frames of satellite sensor values, each frame containing multiple pixels and each frame covering a same geographic location such that for each sub-area of the geographic location there is a time series of pixel feature values;
    for each sub-area of the geographic location, assigning the sub-area to one of at least three land cover labels;
    the processor determining a fraction function for a first sub-area assigned to a first land cover label, the fraction function based on means of pixel feature values of a first cluster of sub-areas assigned to a second land cover label and means of feature values of a second cluster of sub-areas assigned to a third land cover label; and
    reassigning sub-areas that were assigned to the first land cover label to one of the second land cover label and the third land cover label based on the fraction functions of the sub-areas.

2. The method of claim 1 wherein assigning sub-areas to one of at least three land cover labels comprises:
    selecting a pair of neighboring sub-areas;
    determining a distribution of the time-series of pixel feature values for each sub-area in the pair of neighboring sub-areas; and
    assigning the pair of neighboring sub-areas to a same cluster if the distributions of the pair of neighboring sub-areas are similar to each other.

3. The method of claim 2 further comprising, for each sub-area, determining a number of neighboring sub-areas that are assigned to the same cluster as the sub-area, and if the number is below a threshold, assigning the sub-area to the first land cover label.

4. The method of claim 3 further comprising assigning each sub-area in each cluster to one of the second land cover label and the third land cover label by comparing the median value of the time series of pixel feature values of the sub-areas in the cluster to at least one threshold associated with at least one of the second land cover label and the third land cover label.

5. The method of claim 1 wherein determining a fraction function comprises utilizing variances of pixel feature values of a first cluster of sub-areas assigned to the second land cover label and variances of feature values of a second cluster of sub-areas assigned to the third land cover label.

6. The method of claim 1 further comprising:
determining a confidence score for each fraction function; and
modifying at least one fraction function based on the confidence score for the fraction function.

7. The method of claim 6 wherein determining a confidence score for each fraction function comprises determining a probability of a mean of pixel feature values of the first cluster of sub-areas assigned to the second land cover label being observed in a distribution of pixel feature values for sub-areas assigned to the third land cover label.

8. The method of claim 6 wherein modifying at least one fraction value comprises determining a new fraction value based on at least one past fraction value.

9. A system for more efficiently categorizing pixels in images of a surface, the system comprising:
a memory containing features for each pixel in the images, such that for each sub-area of a geographic location captured by the images there is a time series of features;
a processor performing steps of:
determining a distribution for the time series of features for each sub-area;
forming a graph linking neighboring sub-areas;
for each pair of linked sub-areas, breaking the link between the two sub-areas based on differences in the distributions for the time series of features for the two sub areas;
categorizing sub-areas with fewer than a threshold number of links to other sub-areas as a transition category; and
categorizing sub-areas with at least the threshold number of links as one of at least two other categories.

10. The system of claim 9 wherein categorizing sub-areas with at least the threshold number of links as one of at least two other categories comprises forming clusters of sub-areas, for each cluster determining a mean feature value for the sub-areas in the cluster, comparing the mean feature value to a threshold and if the mean feature value is above the threshold assigning all of the sub-areas of the cluster to a first category of the at least two other categories and if the mean feature value is less than the threshold assigning all of the sub-areas of the cluster to a second category of the at least two other categories.

11. The system of claim 10 further comprising for each sub-area in the transition category, determining a fraction function representing a percentage of the sub-area that is similar to the first category of the at least two other category at each of a plurality of times.

12. The system of claim 11 wherein determining a fraction value for a sub-area in the transition category comprises:
identifying a cluster of sub-areas categorized in the first category that is positioned closest to the sub-area in the transition category and determining a separate mean of the feature values for the identified cluster of sub-areas in the first category at each of a plurality of times;
identifying a cluster of sub-areas categorized in the second category that is positioned closest to the sub-area in the transition category and determining a separate mean of the feature values for the identified cluster of sub-areas in the second category at each of the plurality of times; and
forming the fraction function from the means of the feature values for the identified cluster of sub-areas in the first category and the means of the feature values for the cluster of identified sub-areas in the second category.

13. The system of claim 12 wherein forming the fraction function further comprises determining a variance for the feature values for the identified cluster of sub-areas in the first category and using the variance to determine the fraction function.

14. The system of claim 11 wherein the processor performs further steps comprising:
determining a confidence score for the fraction function; and
modifying the fraction function based on the confidence score for the fraction function.

15. The system of claim 14 wherein modifying the fraction function comprises determining a new fraction function based in part on at least one past fraction value.

16. A method for improving identification of land cover from satellite sensor values, the method comprising:
a processor performing steps of:
receiving satellite sensor values for a collection of sub-areas;
forming a graph linking neighboring sub-areas in the collection of sub-areas;
for each pair of linked sub-areas, breaking the link between the two sub-areas based on differences between the satellite sensor values of the two sub areas;
categorizing sub-areas with fewer than a threshold number of links to other sub-areas as having a transition land cover; and
categorizing sub-areas with at least the threshold number of links as having one of at least two other land covers.

17. The method of claim 16 further comprising for each sub-area categorized as having a transition land cover, determining a fraction function that is a function of time.

18. The method of claim 17 wherein determining a fraction function further comprises determining a function that is indicative of a percentage of the sub-area having one of the at least two other land covers at a plurality of different times.

19. The method of claim 18 wherein determining a fraction function comprises determining a mean feature value from the sensor values for a first cluster of sub-areas having a first land cover of the at least two other land covers and determining a mean feature value from the sensor values for a second cluster of sub-areas having a second land cover of the at least two other land covers.

20. The method of claim 19 further comprising determining a confidence score for the fraction function and using the confidence score to alter the fraction function.

* * * * *